(12) United States Patent
Ochiai (10) Patent No.: US 6,195,171 B1
(45) Date of Patent: *Feb. 27, 2001

(54) PRINTER AND INTERFACE UNIT, PRINTING SYSTEM, AND METHOD FOR SETTING COMMUNICATION PARAMETERS IN PRINTER

(75) Inventor: Masato Ochiai, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/644,248

(22) Filed: May 10, 1996

(30) Foreign Application Priority Data

May 12, 1995 (JP) .................................................... 7-114646

(51) Int. Cl.⁷ ...................................................... G06F 15/00
(52) U.S. Cl. .......................................... 358/1.15; 358/1.13
(58) Field of Search ..................................... 395/112, 114,
395/115, 116, 101, 113, 110, 500, 828,
835, 839, 200.02, 200.58, 200.79; 358/468;
710/8, 15, 19; 709/228, 249

(56) References Cited

U.S. PATENT DOCUMENTS 5,537,626 * 7/1996 Kraslavsky et al. ................. 395/828

FOREIGN PATENT DOCUMENTS

0571169 * 11/1993 (EP) .

* cited by examiner

Primary Examiner—Doc Popovici
(74) Attorney, Agent, or Firm—Fitzpatrick, Cella, Harper & Scinto (57) ABSTRACT

A printing system where a network board which connects a printer with a network is installed in the printer, and a parameter setting program for setting communication parameters is downloaded to the printer from the network board. The printer receives the download parameter setting program, stores it into a memory, and links a key-input processing program for an operation panel of the printer with the download parameter setting program. Thereafter, as numerical values of communication parameters of the network board are set by using the operation panel, the set communication parameters are outputted to the network board. This enables the network board to perform communication with the network, by using the input communication parameters.

18 Claims, 11 Drawing Sheets

| TYPE OF NETWORK BOARD | CONTENTS OF SETTING | SET VALUES |
|---|---|---|
| SERIAL BOARD | COMMUNICATION SPEED<br>BIT LENGTH<br>PARITY BIT<br>STOP BIT<br>Xon/Xoff<br>RTS/CTS | 9600 BPS<br>8 BIT<br>NO<br>1 BIT<br>NO<br>YES |
| TCP/IP BOARD | FRAME TYPE<br>IP ADDRESS<br>NET MASK<br>GATEWAY ADDRESS | ETHERNET II<br>160. 61. 60. 154<br>255. 255. 255.0<br>160. 61. 60.1 |
| SCSI BOARD | SCSI ID | 3 |
|  |  |  |

PRINTER AND INTERFACE UNIT, PRINTING SYSTEM, AND METHOD FOR SETTING COMMUNICATION PARAMETERS IN PRINTER

BACKGROUND OF THE INVENTION

1. Field of the Invention

This invention relates to a printer and its interface unit, a printing system, and a method for setting communication parameters in the printer.

2. Description of the Related Art

Printers generally have a serial interface, parallel interface and the like, as a means for communication with a host computer. However, recent spreading networking tendency has popularized printers which can install an optional interface function as interface for connection with various networks.

To realize this optional interface function, various external communication units (hereinafter referred to as "network boards") to be installed in printers have been developed. The printers can be connected to various networks by changing these network boards installed in the printers.

When one of these network boards is installed in the printer for printing via a network, it requires the setting on the network board of network-specific parameters for connecting the printer to the network. If the network board has a serial interface function, for example, a transfer baud rate and a transfer data length must be set.

In the above prior art, however, in order to set the network-specific parameters to the network board, the network board is required to have additional functions or parts; for example, an interface function to set the parameters, or switches for setting the parameters must be provided on the network board. This increases the price of the network board itself.

Even if the parameters are set from the printer by using an operation panel of the printer or the like, the printer must have a parameter setting program that can handle all the variety of network boards. However, it is wasteful to provide such program in the printer, and further, this increases costs of manufacturing the printer.

SUMMARY OF THE INVENTION

The present invention has been made in consideration of the above situation, and has its object to provide a printer, which omits extra functions and parts for setting parameters, by downloading a communication-parameter setting program for performing communication-parameter setting at the printer, and an interface unit, a printing system, and a method for setting communication parameters in the printer.

Further, another object of the present invention is to provide a printer, which downloads a communication-parameter setting program and performs communication based on communication parameters, set at the printer in accordance with the downloaded program, and an interface unit, a printing system, and a method for setting communication parameters in the printer.

Further, another object of the present invention is to provide a printer, which can set various communication parameters for communication with a host computer by using an operation panel of the printer, and an interface unit, a printing system, and a method for setting communication parameters in the printer.

Further, another object of the present invention is to provide a printer, which can set parameters corresponding to an interface unit connected to the printer, by using an operation panel of the printer, and an interface unit, a printing system, and a method for setting communication parameters in the printer.

Further, another object of the present invention is to provide a printer, which can communicate with a connected external device via any communication unit or an interface unit, when installed in the printer, by setting communication parameters or interface parameters of the unit, and an interface unit, a printing system, and a method for setting communication parameters in the printer. Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

The preferred embodiment of the present invention will now be described in detail in accordance with the accompanying drawings. Prior to the description of the present embodiment, the structure of a laser-beam printer employed in the present embodiment will be described with reference to FIG. 1. Note that though the embodiment uses the laser-beam printer, the present invention is not limited to this type of printer, and any printer, such as an ink-jet printer or a thermal printer, may be used.

Figure 1:
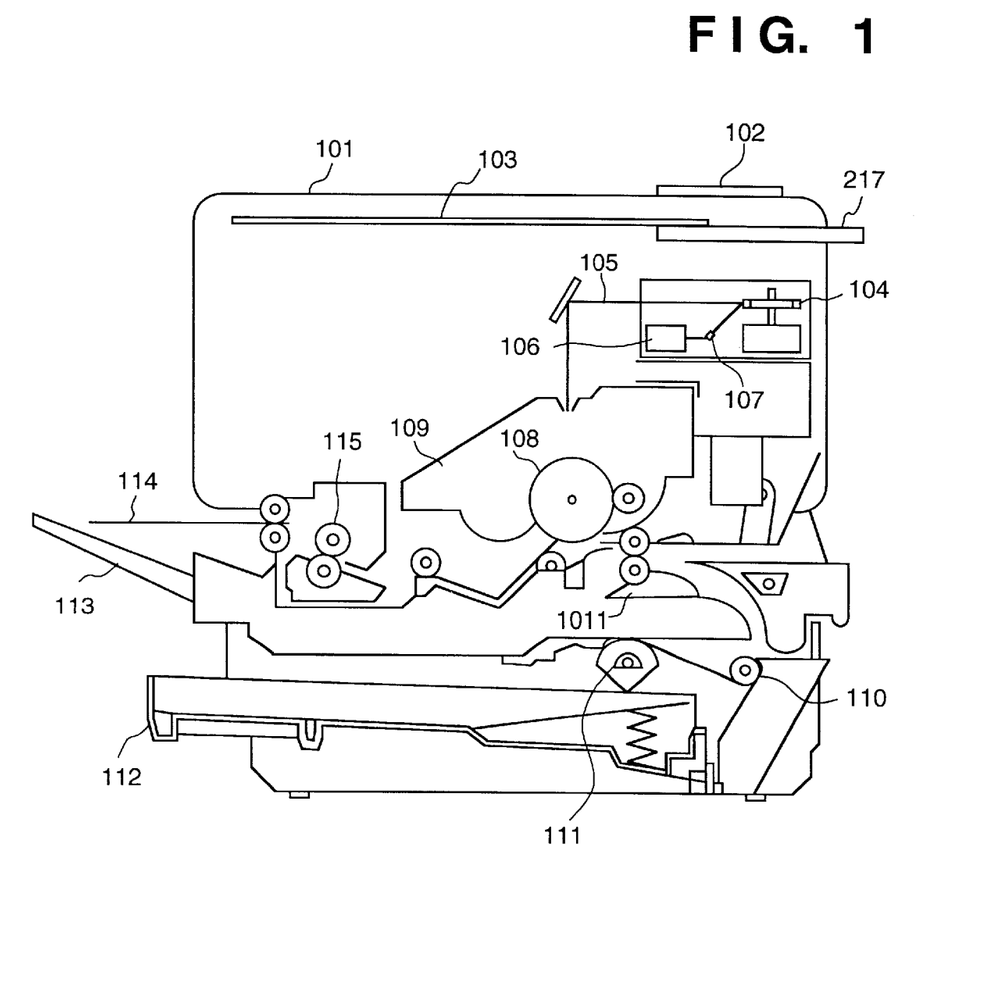
FIG. 1 is a cross-sectional view showing the structure of a laser-beam printer according to an embodiment of the present invention.

FIG. 1 is a cross-sectional view showing the structure of a laser-beam printer (LBP) 101 according to the present embodiment. The LBP 101 can register character patterns and predetermined formats (form data) from, e.g., a host computer 230 as shown in FIG. 2.

In FIG. 1, reference numeral 101 denotes an LBP main body which inputs character information (character codes), form data, macro instructions and the like, supplied from the host computer 230, then stores the input data, generates corresponding character patterns, form patterns and the like corresponding to the input data, and forms images on print sheets as printing media. Numeral 102 denotes an operation panel on which key switches for manual operation, LED displays and an LCD display for displaying printer status and the like are provided. Numeral 103 denotes a printer control unit for controlling the overall LBP 101 and for interpreting character information and the like supplied from the host computer 230. The printer control unit 103 mainly converts character patterns corresponding to the character information into video signals and outputs the signals to a laser driver 106. Numeral 217 denotes a communication unit (network board) detachably connected to the printer control unit 103.

The laser driver 106 is a circuit for driving a semiconductor laser 107. The laser driver 106 turns on/off a laser beam 105 emitted from the semiconductor laser 107, based on the video signal inputted from the printer control unit 103. The laser beam 105 is swept by a rotating polygon mirror 104, thus scan-exposing on an electrostatic drum 108. This forms an electrostatic latent image to be printed on the electrostatic drum 108. The electrostatic latent image is developed by a development unit 109 provided around the electrostatic drum 108, and transferred onto the print sheet. The print sheet is a cut sheet contained in a paper cassette 112 attached to the LBP 101. The cut sheet is fed into the LBP 101 by the rotation of paper-feed roller 111 and a convey roller 110, and supplied to the electrostatic drum 108. Thus, the print sheet, on which the latent image has been transferred from the electrostatic drum 108, is discharged by the rotation of a paper-discharge roller 115, onto an external tray 113.

Figure 2:
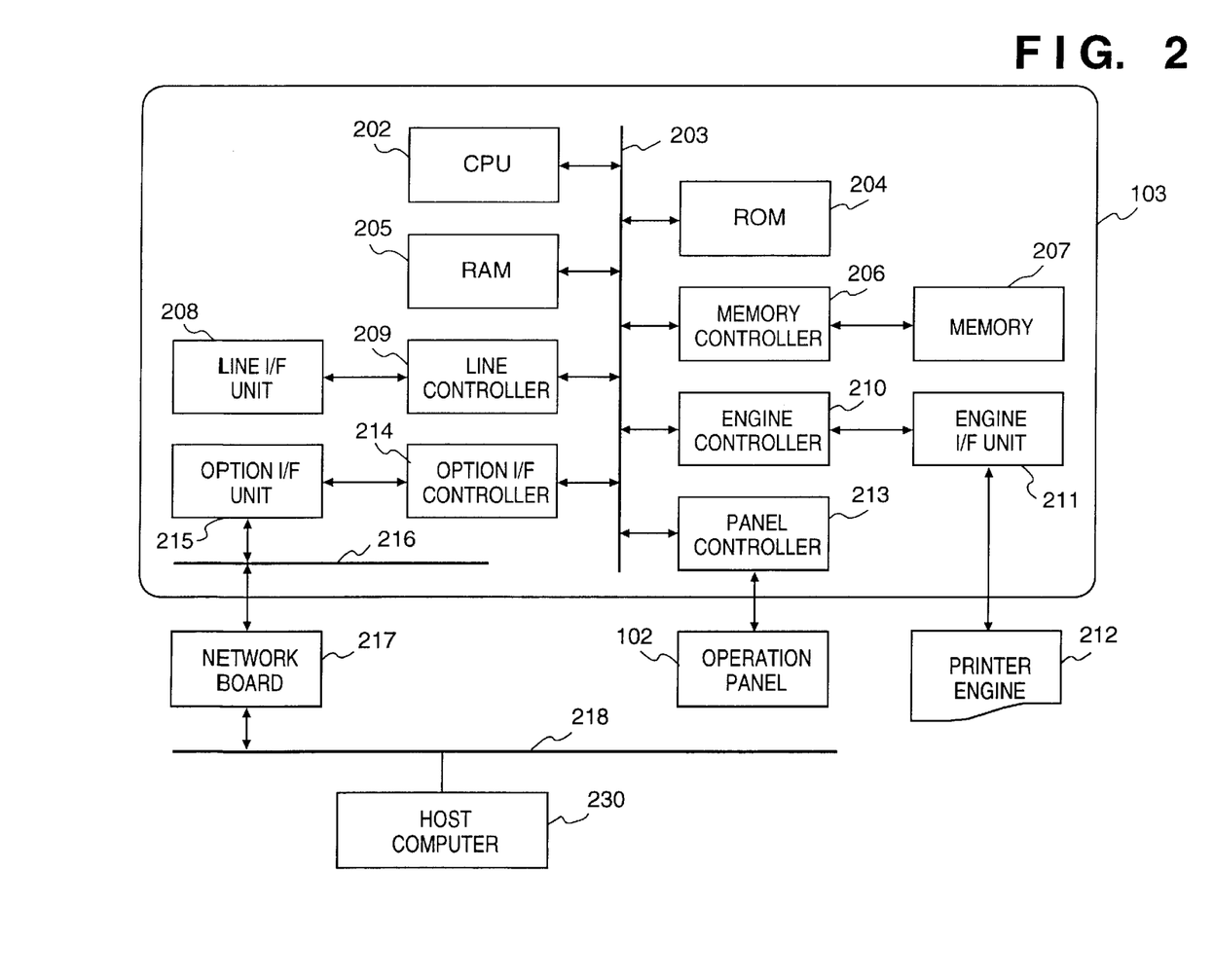
FIG. 2 is a block diagram showing the construction of a printer control unit of the printer according to the embodiment.

FIG. 2 is a block diagram showing the construction of the printer control unit 103 of the LBP 101 of the present embodiment. In FIG. 2, elements corresponding to those in FIG. 1 have the same reference numerals.

In FIG. 2, an option interface (I/F) unit 215 is connected to a bus 203 via an option interface (I/F) controller 214, and further connected to a network board 217 via an extension bus 216, for communication with a network 218. The extension bus 216 connects the network board 217 to the printer control unit 103. Numeral 202 denotes a CPU which controls the respective devices connected to the bus 203, based on control programs stored in a ROM 204. Numeral 205 denotes a RAM which is used as a work area for the operation of the CPU 202, and also used for temporarily storing data received from the network 218 and print data. Numeral 210 denotes an engine controller which controls a printer engine 212 via an engine interface (I/F) unit 211 to perform printing processing. Numeral 206 denotes a memory controller which controls writing/reading of data into/from the memory 207. Numeral 209 denotes a line controller which controls a line interface (I/F) unit 208 to perform data transfer with a communication device (not shown) connected via a line. Numeral 213 denotes a panel controller which controls output of display data to the operation panel 102 and detects key operation on the operation panel 102 and notifies the CPU 202 of the detected input and operation. Numeral 218 denotes the network to which the network board 217 is connected, and 230, the host computer connected to the network 218.

Figure 3:
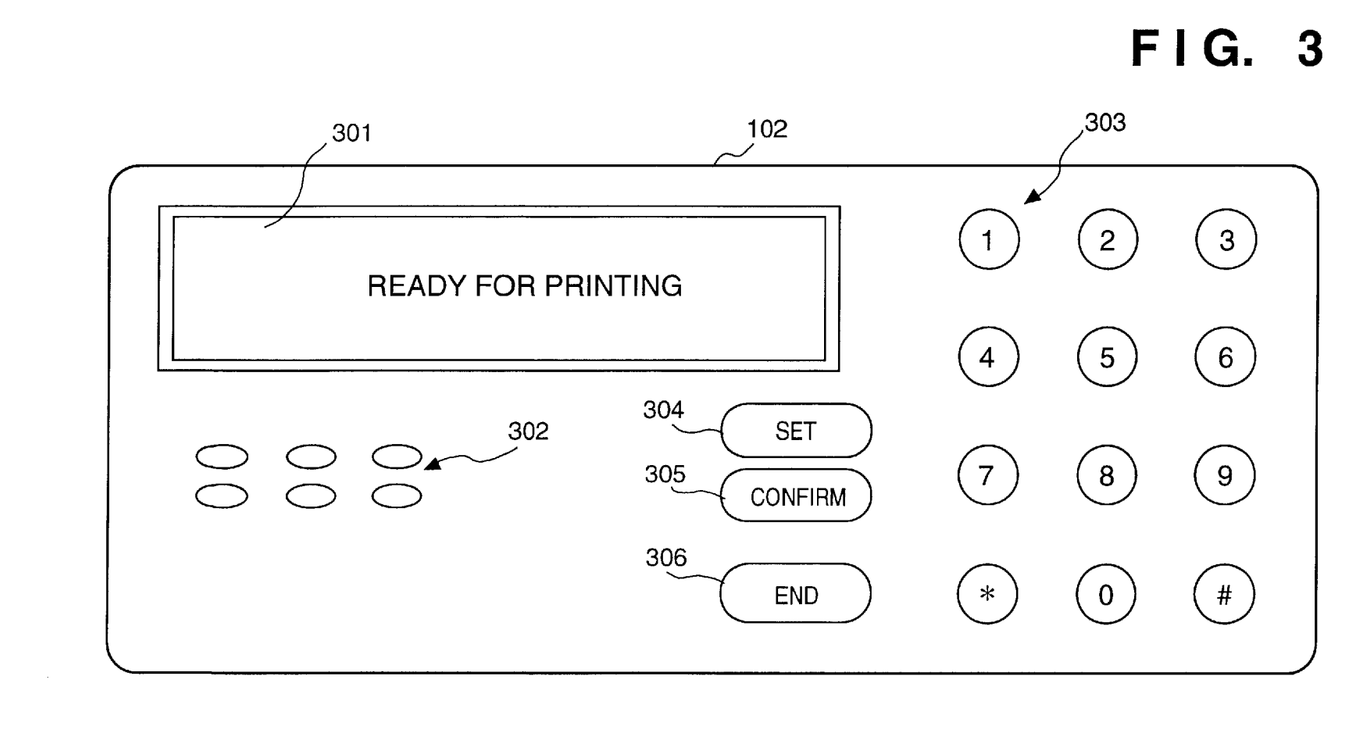
FIG. 3 is a top plan view showing the arrangement of an operation panel of the printer according to the embodiment.

FIG. 3 is a top plan view schematically showing the construction of the operation panel 102 of the LBP 101.

In FIG. 3, numeral 301 denotes an LCD display for displaying the status of the LBP 101, a message to an operator and the like; 302, LEDs for indicating the status of the LBP 101; 303, ten keys for operator's manual operation; 304, a SET key used for designating operation mode of the LBP 101 or setting parameters and the like; 305, a CONFIRM key used for confirming numerical values set by using the ten keys 303; and 306, an END key for terminating parameter setting mode started by pressing the SET key 304. The operator can set the status of the LBP 101, the operation mode, parameters and the like, while confirming displayed contents on the LCD display 301.

Figure 4:
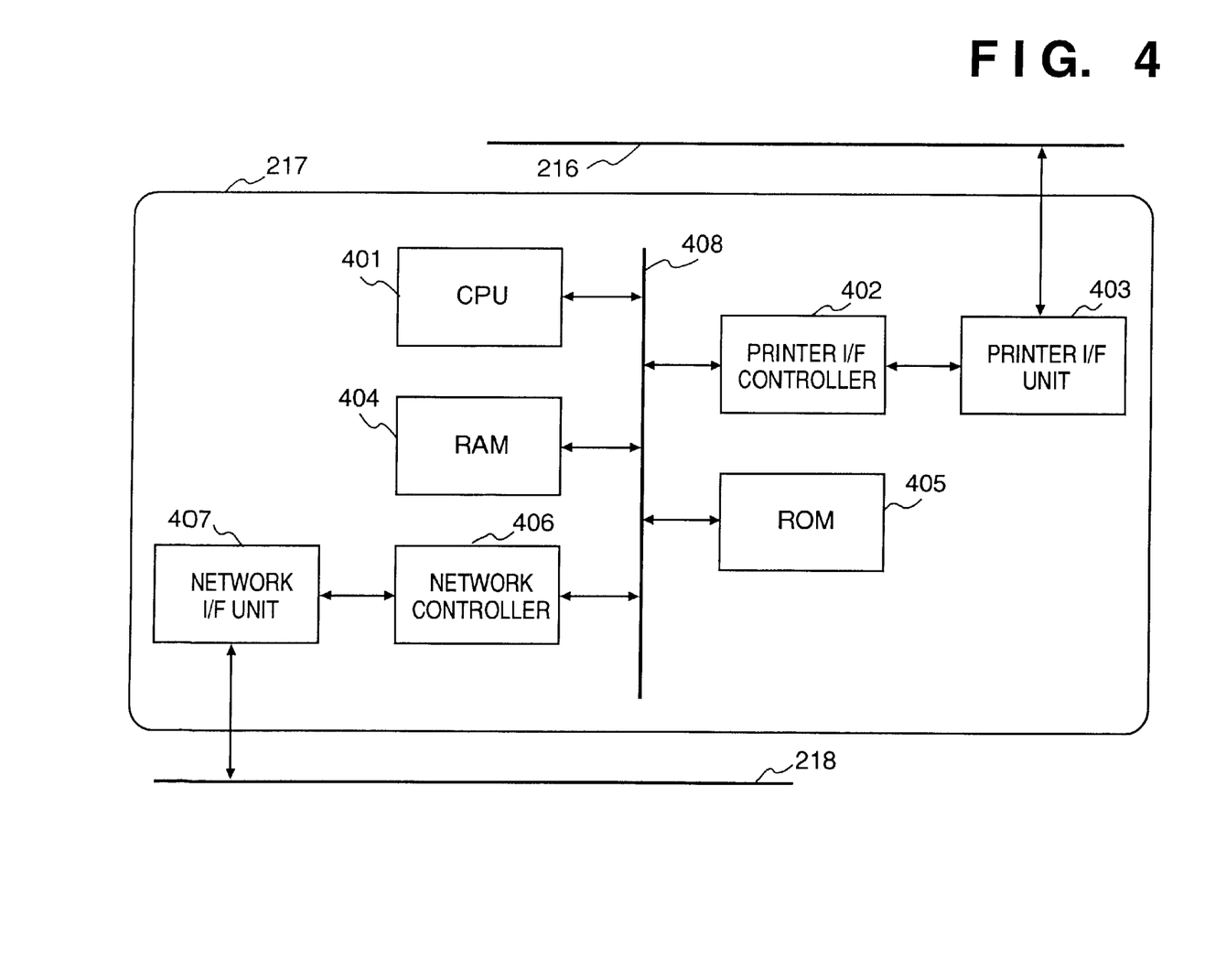
FIG. 4 is a block diagram showing the construction of a network board according to the embodiment.

FIG. 4 is a block diagram showing the construction of the network board 217 connected to the LBP 101 of the present embodiment. In FIG. 4, elements corresponding to those in FIG. 1 have the same reference numerals.

In FIG. 4, the network board 217 is connected to the printer control unit 103 via the extension bus 216, and also connected to the network 218. The network board 217 has a function to receive data from the network 218 or output the received data to the LBP 101, and also to receive data from the LBP 101 and transmit the received data to the network 218.

In FIG. 4, numeral 401 denotes a CPU which controls the respective devices connected to a bus 408, based on control programs stored in a ROM 405. Numeral 404 denotes a RAM used for temporarily storing data used by the CPU 401, data received from the network 218 and data received from the LBP 101. Numeral 402 denotes a printer interface (I/F) controller which performs communication with the LBP 101 via a printer interface (I/F) unit 403 and the extension bus 216. Numeral 406 denotes a network controller which performs communication with the network 218 via a network interface (I/F) unit 407.

Figure 5:
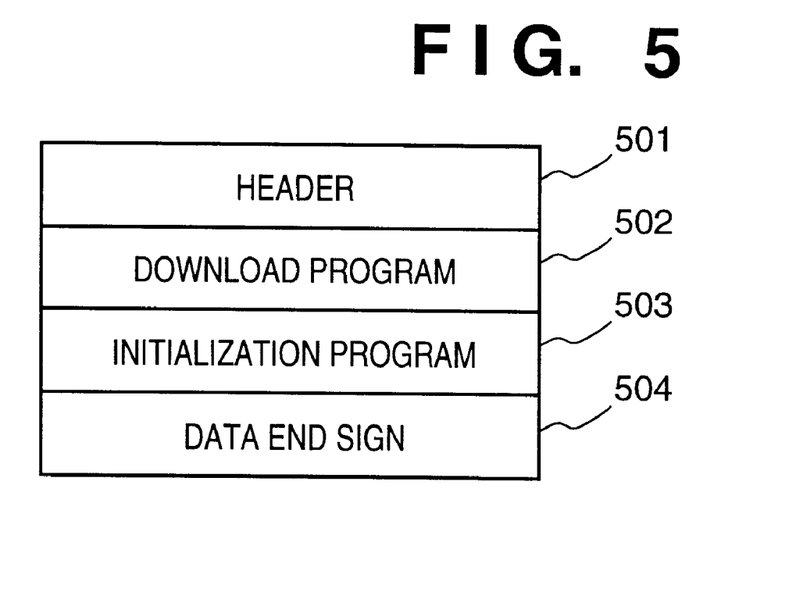
FIG. 5 is a format example of program data downloaded from the network board to the printer according to the embodiment.

FIG. 5 is a format example of a parameter setting program downloaded from the network board 217 to the LBP 101 according to the present embodiment.

In FIG. 5, numeral 501 denotes a header indicating that this data is not print data but is the parameter setting program being downloaded. Numeral 502 denotes the download program which is downloaded to the LBP 101 then stored into the RAM 205, and executed in accordance with key operation on the operation panel 102. Numeral 503 denotes an initialization program as a link program for linking the download program with a pre-stored program in the LBP 101 so as to execute the linked programs. Numeral 504 denotes a data end sign indicating the termination of the download program.

Note that in the present embodiment, this program data to be downloaded is stored in the ROM 405 of the network board 217.

Figure 6:
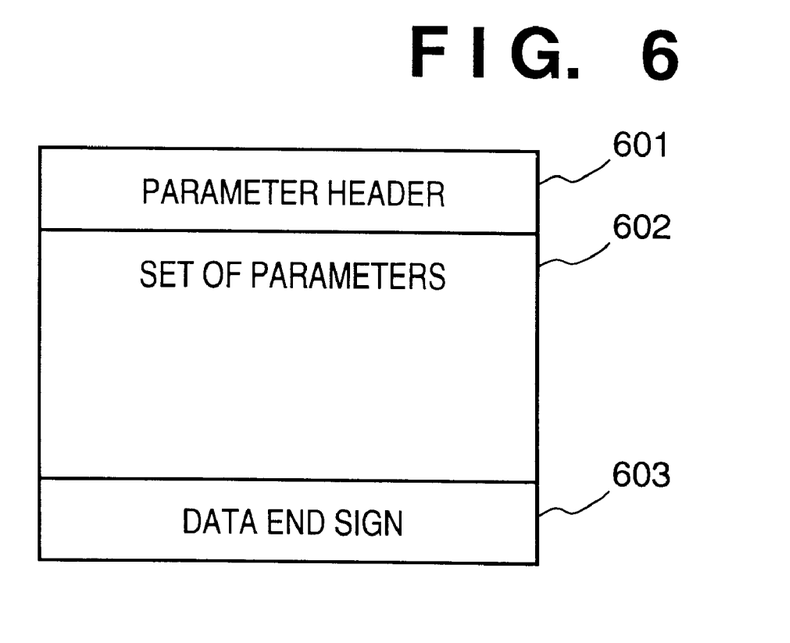
FIG. 6 is a format example of parameter data sent to the network board from the printer according to the embodiment.

FIG. 6 is a format example of parameter data sent to the network board 217 from the LBP 101 according to the present embodiment.

In FIG. 6, numeral 601 denotes a parameter header indicating that this data is not data to be transmitted to the network 218 but parameter data to the network board 217. Numeral 602 denotes a set of parameters to be sent from the LBP 101 to the network board 217. Numeral 603 denotes a data end sign indicative of the end of the parameter data.

Note that in the present embodiment, the CPU 202 of the LBP 101 sets parameters in accordance with the operator's key-inputs from the operation panel 102, and transmits the set parameters to the network board 217.

Figure 7:
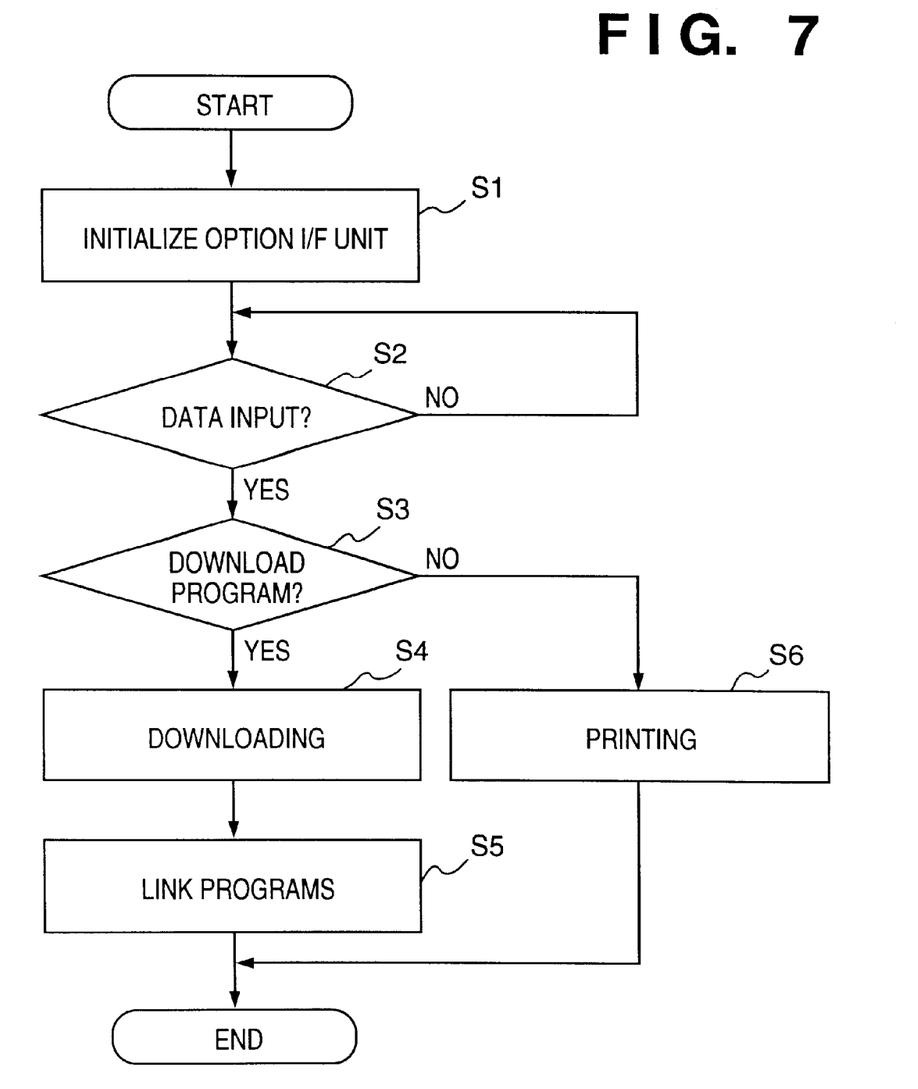
FIG. 7 is a flowchart showing the process of receiving data from the network board, in the printer according to the embodiment.

FIG. 7 is a flowchart showing the process of receiving the download data from the network board 217 in the LBP 101 according to the present embodiment. In this embodiment, a control program for executing this process is stored in the ROM 204, however, it may be arranged such that the program is stored into a storage medium such as a floppy, and the LBP 101 has a disk driver; using this disk driver, the program stored in the floppy disk or the like can be read, then again stored into the RAM 205, and the process can be executed in accordance with the program in the RAM 205.

When the power of the LBP 101 is turned on, the process proceeds to step Si, at which the CPU 202 of the LBP 101 and the CPU 401 of the network board 217 perform predetermined communication-initialization operations, via the option I/F unit 215 and the printer I/F unit 403. After the initialization processing has been completed, the process proceeds to step S2, at which the CPU 202 of the LBP 101 goes in the idle status, waiting for data from the line controller 209 or the option I/F controller 214.

As data has been inputted at step S2, the process proceeds to step S3, at which a header of the input data is discriminated. If the header is the header 501, indicating that the data is download program, the process proceeds to step S4, at which the parameter setting program (download program 502) sent from the network board 217 is received and stored into the RAM 205. In this downloading, stack assignment and address rearrangement are made. At step S5, by the initialization program 503 of the downloaded parameter setting program, the program corresponding to the key-input on the operation panel 102, stored in the ROM 204, and the downloaded program are linked. This enables parameter setting in the LBP 101 by key-input on the operation panel 102.

On the other hand, at step S3, if the header is not the download program header 501, the process proceeds to step S6 because the data is print data, and printing processing is performed based on the received print data.

As the parameter setting program has been stored into the RAM 205, setting of parameters based on the key-input operation on the operation panel 102 is performed, in accordance with the stored program. This process will be described with reference the flowchart of FIG. 8.

Figure 8:
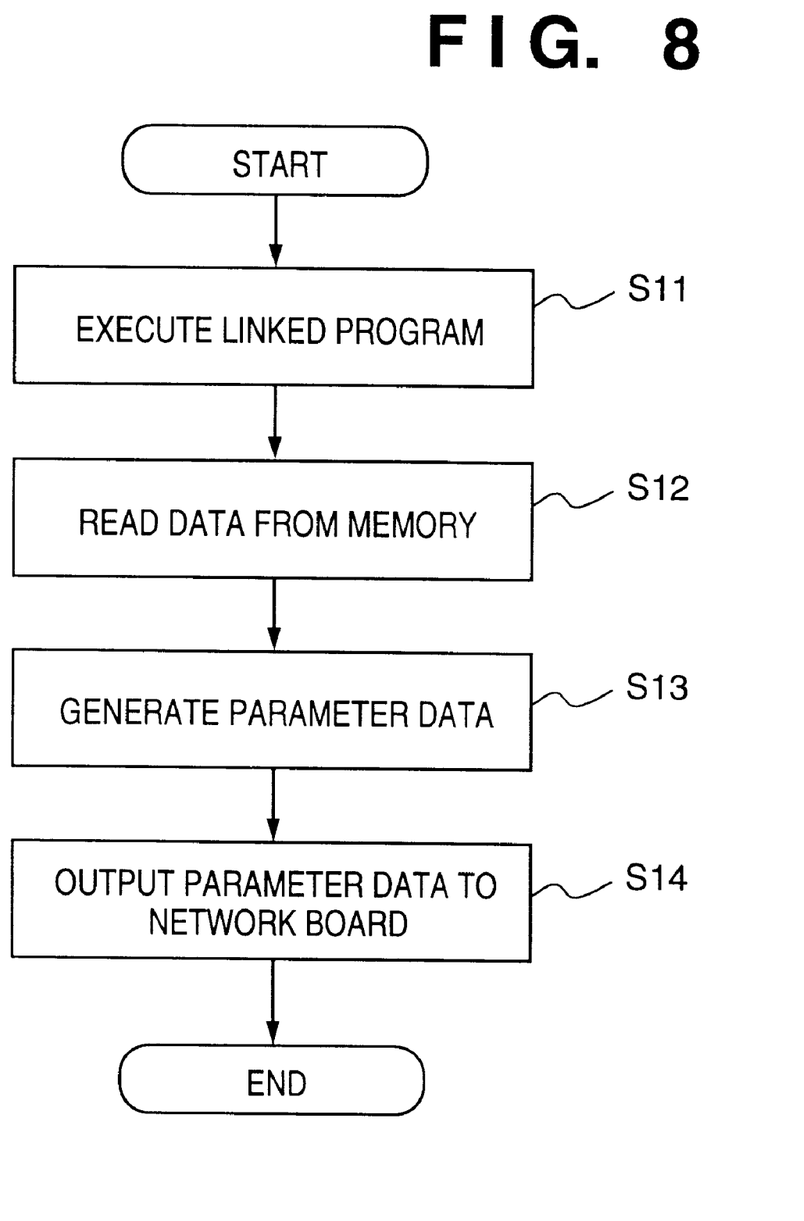
FIG. 8 is a flowchart showing the process of transmitting parameters to the network board from the printer according to the embodiment.

FIG. 8 is a flowchart showing the process of setting parameters by key-input on the operation panel 102 of the LBP 101 according to the present embodiment. This process is executed in accordance with cooperation of the program stored in the ROM 204 and the downloaded program stored in the RAM 205.

When the parameter setting (SET) key 304 of the operation panel 102 is pressed by the operator, the CPU 202 interprets the downloaded program (502) stored in the RAM 205 and executes it (step S11). At this time, the parameters set by the operator's key-input are stored into the memory 207 via the memory controller 206. Note that the processing at step S11 will be described in detail later with reference to the flowchart of FIG. 9.

After the operator's key-input on the operation panel 102 has been completed, the CPU 202 reads the set parameters stored in the memory 207 at step S12. Next, the process proceeds to step S13, at which parameter data in the parameter format as shown in FIG. 6 is generated; specifically, the data format having the header 601, the set of parameters 602 and the data end symbol 603, is generated based on the parameters read from the memory 207. At step S14, the parameter data is outputted to the network board 217 via the option I/F controller 214.

Figure 9:
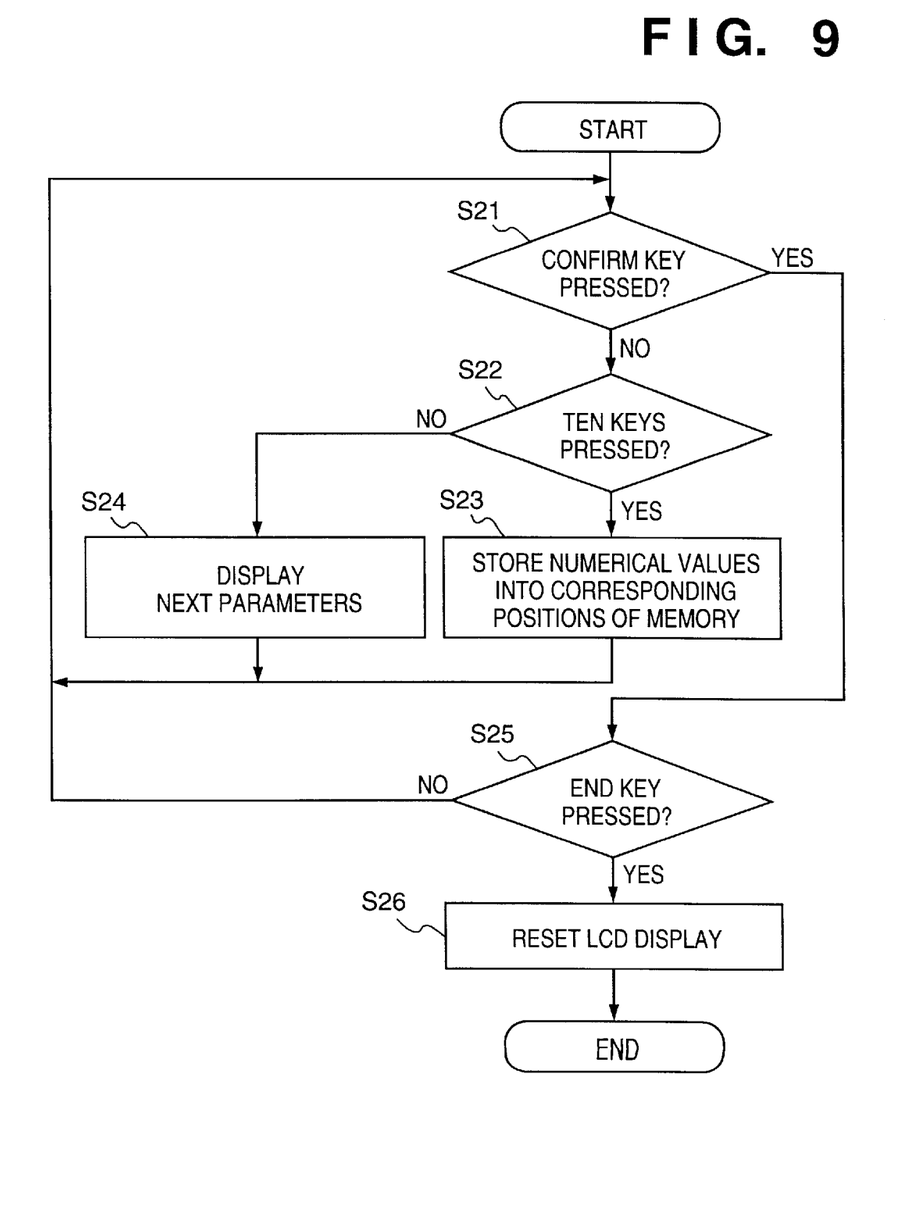
FIG. 9 is a flowchart showing the process of parameter setting in the printer according to the embodiment.

FIG. 9 is a flowchart showing the parameter setting processing in accordance with the operator's key-input, executed at step S11 in FIG. 8. This processing starts when the SET key 304 of the operation panel 102 is pressed.

First, at step S21, whether or not the CONFIRM key 305 has been pressed is examined. If YES, the process proceeds to step S25, at which whether or not the END key 306 has been pressed is examined. If YES, the process proceeds to step S26, at which the display contents on the LCD display 301 are reset to the state before parameter setting processing, and the parameter setting ends.

If NO at step S21, i.e., if the CONFIRM key 305 has not been pressed, the process proceeds to step S22, at which whether or not the ten keys 303 have been pressed is examined. If YES, the process proceeds to step S23, at which numerical values corresponding to the key-input with the ten keys 303 are stored into corresponding positions of the memory 207 via the memory controller 206. Then the process proceeds to step S21 to wait for the next key-input.

Note that if the SET key 304 instead of the ten keys 303 has been pressed at step S23, the process proceeds to step S24, at which the next parameters for setting are displayed on the LCD display 301, and the operator's key-input is waited.

Thus set parameters are stored into predetermined addresses in the memory 207. The meanings of the numerical values depend on the downloaded parameter setting program.

In this manner, by using the same operation panel 102, different parameters can be set for respective network interfaces, in accordance with downloaded parameter setting programs. The parameters set and stored into the memory 207 are transmitted to the network board 217 via the option I/F controller 214 and the option I/F unit 215, and are utilized for setting communication mode at the network board 217 for communication with the network 218.

Figure 10:
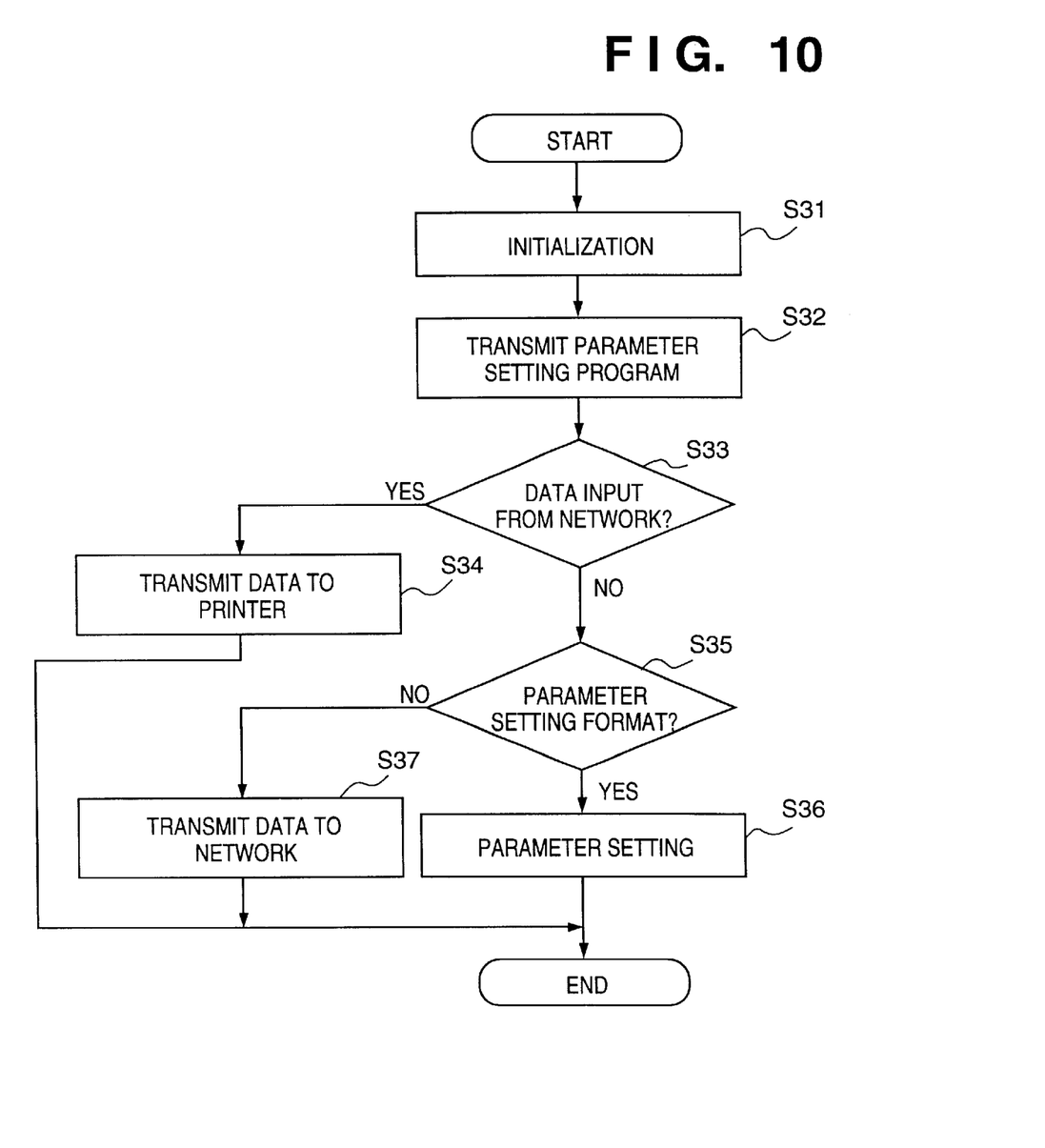
FIG. 10 is a flowchart showing data reception process at the network board, according to the embodiment.

FIG. 10 is a flowchart showing data reception process at the network board 217. A control program for performing this processing is stored in the ROM 405.

When the power of the LBP 101 is turned on, the CPU 401 of the network board 217 and the CPU 202 of the printer control unit 103 perform a predetermined communication initialization operation via the respective interface units (S31). After the completion of the initialization, the process proceeds to step S32, at which the CPU 401 of the network board 217 supplies the parameter setting program (download program) 502 stored in the ROM 405 to the LBP 101 via the printer I/F unit 403 and the extension bus 216. This allows the printer control unit 103 to perform processing shown in the flowchart of FIG. 7, where the parameter setting program is stored into the RAM 205. Then the process proceeds to step S33, at which the CPU 401 becomes in idle status (normal status), waiting for data from the LBP 101 or data from the network 218.

At step S33, if data from the network 218 is received via the network controller 406, the process proceeds to step S34, at which the received data is transmitted to the printer control unit 103 via the printer I/F controller 402 and the printer I/F unit 403, as usual processing. The LBP 101 then performs printing based on the print data transmitted by the host computer 230 and received via the network 218.

On the other hand, data from the printer control unit 103 is received via the printer I/F controller 402 at step S33, the process proceeds to step S35, at which the header of the received data is examined. If the header is the parameter header 601, the process proceeds to step S36, at which the communication parameters set at the network I/F unit 407 are changed via the network controller 406.

On the other hand, if the header of the received data is that of a normal data at step S35, the process proceeds to step S37, at which the data from the printer control unit 103 is transmitted to the network 218 via the network controller 406 and the network I/F unit 407.

Figure 11:
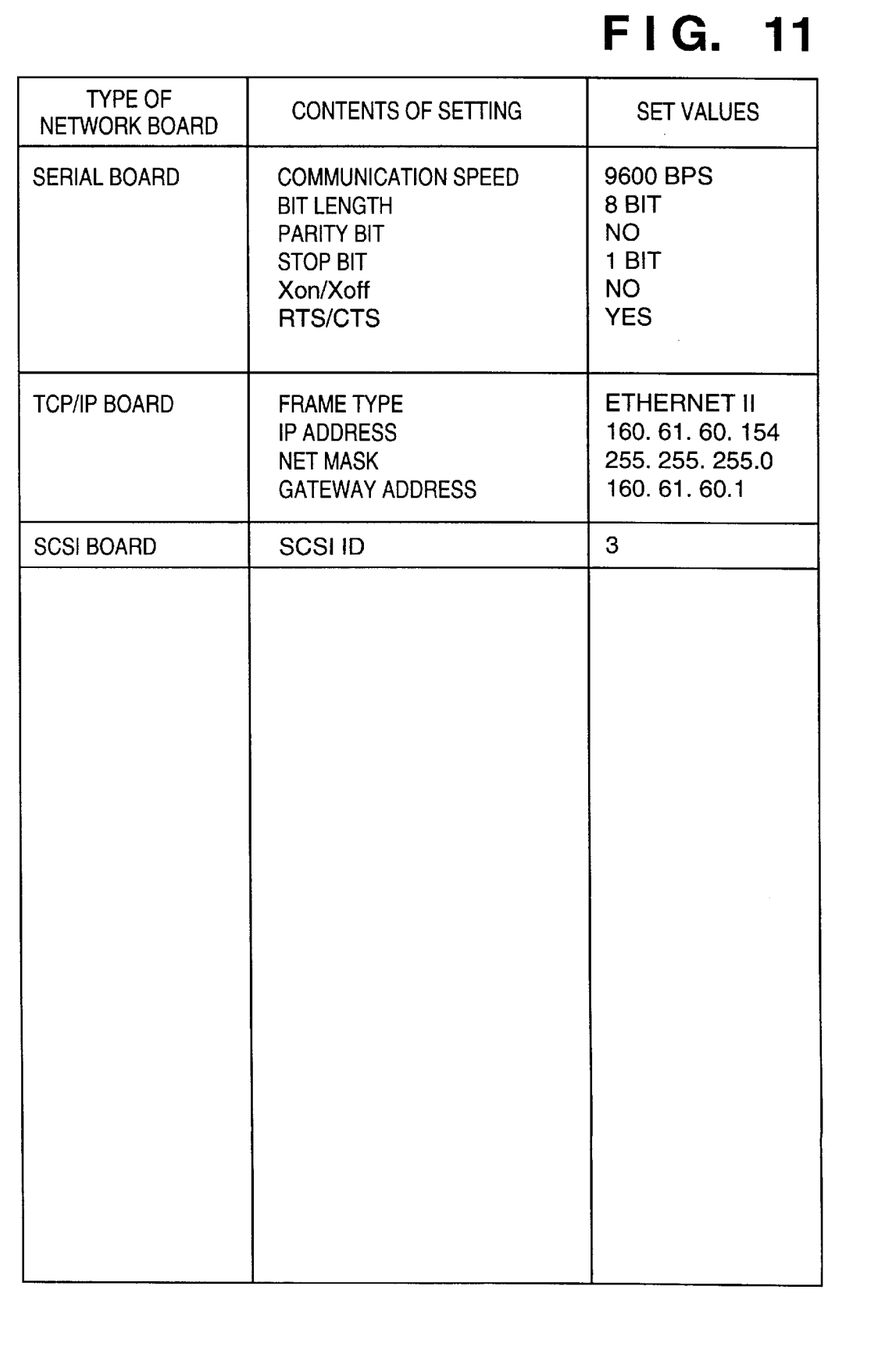
FIG. 11 is an example of types of network boards and contents of settings thereof.

In the present embodiment, the types of the network board 217 are, e.g. a serial board for serial interface, a TCP/IP board, and a SCSI board, as shown in FIG. 11. The setting contents are predetermined in accordance with the types of the respective boards. Accordingly, after the parameter setting program has been downloaded from the network board 217 to the RAM 205, if the SET key 304 of the operation panel 102 is pressed, parameters "COMMUNICATION SPEED", "BIT LENGTH", "PARITY BIT" etc., and corresponding instructions "YES: 1" "NO: 0" etc. are displayed on the LCD display 301. If corresponding numerical values and "1" are inputted with the ten keys 303, setting regarding the "YES" instruction is performed, while if "0" is inputted, setting regarding the "NO" instruction is performed. Thus, as shown in FIG. 11, communication mode can be set in accordance with the type of the network board 217.

Note that in the present embodiment, the parameter setting program (download program) is stored in the ROM 405 of the network board 217, however, the present invention is not limited to this arrangement. It may be arranged, for example, to download this program from the host computer 230 via the network 218. In this case, the network I/F unit 407 of the network board 217 operates based on predetermined parameter values.

The present embodiment has been described as the case where the network board 217 is connected to the network 218, however, similar advantages can be obtained in a case using an external communication device which directly communicates with a host computer, or case using various communication boards such as a facsimile board connected to a telephone line or communication line.

Further, the communication method between the printer and the network board 217 is applicable to any device so far as it is a communication unit capable of bidirectional communication. The present invention is not limited to the printer, but can be applied to general communication devices.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

Figure 12:
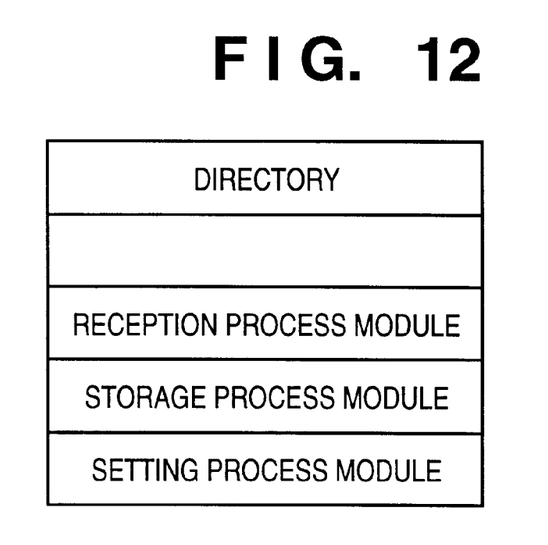
FIGS. 12 and 13 are memory maps of storage media according to the present invention.
Figure 13:
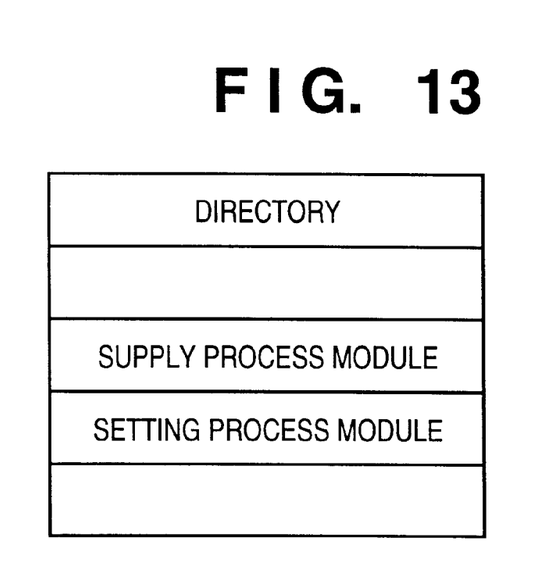

In a case where the present invention is applied to the aforesaid storage medium, the storage medium, which stores the programs loaded to the printer control unit, stores program codes corresponding to the flowcharts described in the embodiment. Briefly, the storage medium stores each module shown as an example of a memory map in FIG. 12. More specifically, program codes which correspond to the reception process module, the storage process module, and the setting process module, at least, are to be stored in the storage medium. Further, as shown in FIG. 13, the storage medium, which stores the program loaded to the network board, stores at least the supply process module and the setting process module.

As described above, according to the present invention, a parameter setting program is downloaded from a network board to a printer, and by key-input on an operation panel of the printer, communication parameters of the network board can be set. This provides a low-price printer and a network board.

The present invention is not limited to the above embodiments and various changes and modifications can be made within the spirit and scope of the present invention. Therefore, to apprise the public of the scope of the present invention, the following claims are made.

What is claimed is:

1. A printing apparatus, in which an interface unit can be installed, by which said printing apparatus is connected to and communicates with an external device, the interface unit storing information necessary for setting of communication parameters of the interface unit, said printing apparatus comprising:

input means for inputting print data via the interface unit;
downloading means for downloading the information from the interface unit;
key-input means for inputting key-input information; and
control means for displaying the communication parameters peculiar to the interface unit on a display, forming parameter data based on the key-input information inputted from said key-input means in accordance with the information downloaded from the interface unit, adding a header to the parameter data in order to indicate that the parameter data is not to be transmitted to a network but is to be transmitted to the interface unit, and sending the parameter data to said interface unit,
wherein the interface unit receives the parameter data sent by said control means and changes the communication parameters of the interface unit based on the parameter data.

2. The printing apparatus according to claim 1, wherein said interface unit is a communication unit which connects said printing apparatus with said external device.

3. The printing apparatus according to claim 1, wherein said interface unit can be removably installed in said printing apparatus.

4. The printing apparatus according to claim 1, wherein said control means executes a parameter setting program.

5. The printing apparatus according to claim 1, wherein the information includes a parameter setting program.

6. The printing apparatus according to claim 5, wherein the parameter setting program has a function of linking a panel processing program for said key-input means with the parameter setting program.

7. A printing system in which a printing apparatus and a host computer are connected to each other via a line, wherein said printing apparatus comprises:

an interface unit, installed in said printing apparatus and removably connected to the line, by which said printing apparatus communicates with said host computer, said interface unit storing information necessary for setting of communication parameters of the interface unit;

input means for inputting print data via said interface unit;

downloading means for downloading the information from the interface unit;

key-input means for inputting key-input information; and control means for displaying the communication parameters peculiar to said interface unit on a display, forming parameter data based on the key-input information inputted from said key-input means in accordance with the information downloaded from the interface unit, adding a header to the parameter data in order to indicate that the parameter data is not to be transmitted to a network but is to be transmitted to the interface unit, and sending the parameter data to said interface unit, wherein the interface unit receives the parameter data sent by said control means and changes the communication parameters of the interface unit based on the parameter data.

8. The printing system according to claim 7, wherein said control means executes a parameter setting program.

9. The printing system according to claim 7, wherein the information includes a parameter setting program.

10. The printing system according to claim 9, wherein the parameter setting program has a function of linking a panel processing program for said key-input means with the parameter setting program.

11. A communication parameter setting method for setting communication parameters in a printing apparatus in which is installed an interface unit which is connected to an external device and by which the printing apparatus can communicate with said external device, the interface unit storing information necessary for the setting of the communication parameters of the interface unit, said method comprising:

a reception step of receiving print data via the interface unit;

a downloading step of downloading the information from the interface unit;

an execution step of displaying the communication parameters peculiar to the interface unit on a display, and causing inputting of parameters from an operation panel in accordance with the information; and a setting step of forming parameter data based on the parameters inputted from the operation panel in accordance with the information downloaded from the interface unit, adding a header to the parameter data in order to indicate that the parameter data is not to be transmitted to a network but is to be transmitted to the interface unit, and sending the parameter data to the interface unit, wherein the interface unit receives the parameter data and changes the communication parameters of the interface unit based on the parameter data.

12. The method according to claim 11, wherein said setting step executes a parameter setting program.

13. The method according to claim 11, wherein the information includes a parameter setting program.

14. The method according to claim 13, wherein the parameter setting program has a function of linking a panel processing program for the operation panel with the parameter setting program.

15. A computer readable storage medium holding information necessary for setting communication parameters in a printing apparatus which is connected to an external device via an interface unit, the storage medium having:

a reception process module for receiving print data via the interface unit;

a downloading process module for downloading the information from the interface unit; and a setting process module for displaying communication parameters peculiar to the interface unit, forming parameter data based on key-input information inputted from an operation panel in accordance with the information downloaded from the interface unit, adding a header to the parameter data in order to indicate that the parameter data is not to be transmitted to a network but is to be transmitted to the interface unit, and sending the parameter data to the interface unit.

16. The storage medium according to claim 15, wherein said setting process module includes an executing process module for executing a parameter setting program.

17. The storage medium according to claim 15, wherein the information includes a parameter setting program.

18. The storage medium according to claim 17, wherein the parameter setting program has a function of linking a panel processing program for the operation panel with the parameter setting program.

* * * * *